Figure 1:
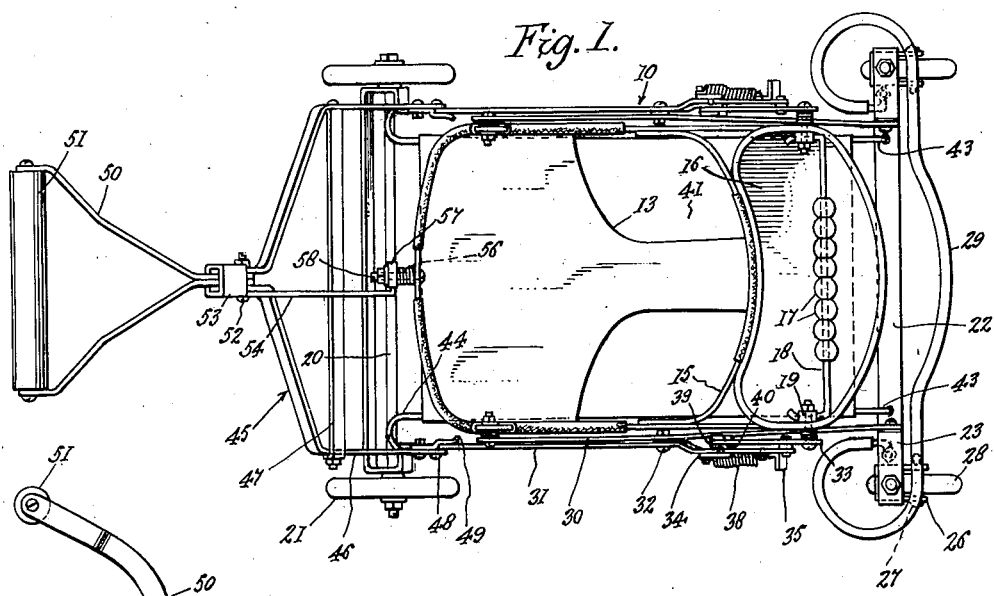

May 24, 1949.  R. MOSTER  2,471,004
BABY STROLLER-WALKER

Filed May 21, 1946  2 Sheets-Sheet 1

INVENTOR.
Robert Moster
BY
Thomas F. Healy
Attorney

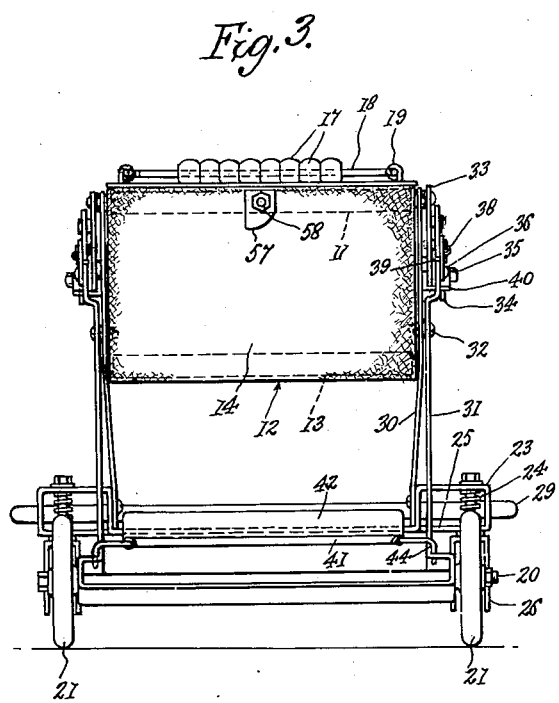

Patented May 24, 1949

2,471,004

UNITED STATES PATENT OFFICE 2,471,004

BABY STROLLER-WALKER

Robert Moster, Rushville, Ind.

Application May 21, 1946, Serial No. 671,135

3 Claims. (Cl. 280—36)

This invention relates generally to juvenile furniture and more particularly to a collapsible baby stroller-walker which may be easily set up for operation or folded into a relatively compact unit for transportation or storage.

The primary object of this invention resides in the provision of a baby stroller-walker, in one machine, comprising a frame body which is easily collapsible and with additional means to lock the frame in operative position.

Another object is to provide the baby stroller-walker with a foldable handle element adapted to be removably secured to the body of the stroller-walker.

A further object is to provide the baby stroller so designed and constructed that the stroller may be used for various purposes.

In its broad aspects, this invention relates to a baby stroller comprising, a collapsible frame body, and a foldable handle element adapted to be removably secured to said frame body, and more particularly where means are provided to selectively lock the frame in operative position.

Other objects and advantages of this invention will be apparent from the following description thereof and from the claims appended thereto.

Figure 2:
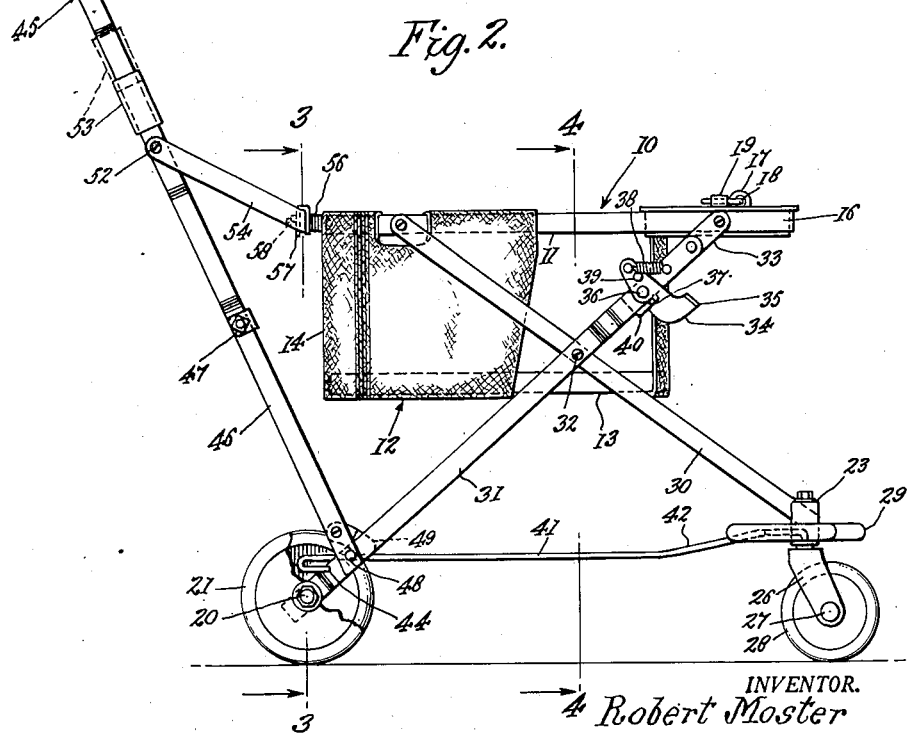

In the drawing wherein like numerals refer to like or corresponding parts throughout the several views;

Figure 1 is a top plan view of the baby stroller embodying the features of my invention, Figure 2 is a side elevation of the baby stroller, Figure 3 is a view taken along the line 3—3 of Figure 2 in the direction of the arrows, Figure 4 is a view taken along the line 4—4 of Figure 2, in the direction of the arrows, Figure 5 is a plan view of the handle for the baby stroller in disassembled relation, and Figure 6 is a view of the foot rest for the baby stroller in disassembled position.

Referring to the drawing, the numeral 10, generally represents a frame body structure or chassis for the baby stroller. The body 10 comprises a top frame portion 11, substantially of rectangular shape, which carries a seat generally represented as 12 and including a wooden bottom 13 and sides of canvas 14 or other foldable material secured to frame 11.

A curved bar 15 extends transversely of the frame 11 and is secured thereto in any suitable manner. Forwardly of the curved bar 15, is disposed a toy tray 16 which is secured to the bar 15 and the frame 11. Toy tray 16 is provided with suitable toy balls 17 which are movable along a wire rod 18. Wire rod 18 is secured to a pivot piece 19 at each end thereof, with said pivot pieces 19 being secured to the frame 11. Toy balls 17 thus may be raised or lowered as desired through a limited movement.

The bottom body structure of the baby stroller includes a rear axle 20 to the ends of which are journaled two ground engaging wheels 21 mounted for rotation. The front wheel carrying assembly includes a transverse cross rod 22. To each end portion of cross rod 22 is mounted a rectangular bracket 23 in which is secured a pin 24 adapted for limited vertical movement against the bias of a spring 25 disposed about the pin 24. A U-shaped bracket 26 is carried by each pin 24, and adapted for swivel movement and is apertured to receive a stub axle 27 upon which is mounted a ground engaging wheel 28.

A rubber covered bumper rod 29 is secured at the free ends thereof to the cross bar 22 in any suitable manner.

The collapsible body structure includes two side frame portions each composed of two bars 30 and 31 pivotally secured together at their points of intersection 32. Cross bar 30 has one end thereof pivotally secured to the frame 11 while the other end thereof is fastened to a side of the rectangular bracket 23.

The cross bars 31 are preferably made of one piece of steel which extends diagonally across one cross bar 30 and downwardly and parallel along the length of axle 20 and thence diagonally upwardly across the second cross bar 30. The piece of steel which forms cross bars 31 is provided intermediate the free ends thereof with two apertures through which the axle 20 passes.

Each cross bar 31 terminates short of the top frame 11. A pair of tie bars, each of which is designated by the numeral 33 is pivotally fastened to each side of the frame 11. Each cross bar 31 is pivotally secured to its corresponding tie bar 33 intermediate the ends thereof.

A bar locking assembly is associated with each cross bar 31 and comprises a lever 34 provided with a laterally extending flange 35 which serves as a handle. The lever 34 is pivotally secured to the cross bar 31 by the lug 36, and is provided with a cut away portion 37. A spring 38 is secured to one end of the lever and has its other end fastened to cross bar 31. A stop member 39 extends through lever 34 to sometimes engage with cross bar 31.

An L-shaped cross piece 40 is secured to each tie bar 33 and extends across a side edge of the tie bar 33 and across and beyond the corresponding side edge of the short cross bar 31 to engage in the cut out portion 37 of the lever 34 to lock the respective tie bars 33 and cross bars 31 together to prevent independent relative movement thereof.

In operation, each of the levers 34 is moved counterclockwise against the tension of springs 38 to move the slots 37 out of engagement with the L-shaped cross pieces 40 to break the bond between tie bars 33 and the cross bars 31 to permit the frame to collapse in a lazy tong movement about pivot points 32.

Referring to Figure 6 there is shown a foot rest 41 having a front slant portion 42 for the feet. Bent rods 43 are provided, one on each side of the slant portion 42 for removable engagement in apertures disposed in the front cross rod or bar 22. U-shaped elements 44 are provided at the rear of foot rest 41, each for engagement around the lower end of each cross rod 31.

Referring to Figure 5, there is shown a detachable foldable handle assembly generally designated by the numeral 45. The handle assembly 45 comprises a frame body including two legs 46 steadied by a brace 47 secured to the legs 46 in any suitable manner, as by nut and bolt. Each leg 46 is provided at its lower end with an inwardly projecting lug 48 adapted for engagement in suitable holes disposed in the lower ends of cross bars 31. Movable elements 49 are secured one to each inner side of each leg 46 adjacent each lug 48. When the handle 45 is fastened to the body of the baby stroller the lugs 48 are engaged through their respective openings in the cross bars 31 and elements 49 are moved into contact with lugs 48 to prevent said lugs 48 from becoming disengaged from their respective openings.

When the device of the present invention is employed as a walker, the foot rest shown in Figure 6 is removed so that the feet of the child user may touch the ground and propel the walker. The detachable handle assembly 45 may be removed if desired when using the device as a walker.

Two arms 50 form the opposite portion of the frame handle assembly 45. A hand engaging element 51 is fastened to the free ends of the arms 50.

The arms 50, at the lower ends thereof, engage a pivot pin 52 which extends through suitable openings in the arms 50, and through suitable openings in the upper end portions of the legs 46, with the arms 50 being disposed between the legs 46. A slidable bracket 53 engages over the end portions of the arms 50 and the legs 46 when the said legs and arms are locked together against relative independent movement. When it is desired to break the joint between the arms 50 and the legs 46, the bracket 53 is slid upwardly over the arms 50. In this manner arms 52 can be folded over legs 46.

A tie element 54 is also pivotally secured to the pivot pin 52, rests against one of the legs 46 and is provided with a slot 55 in the free movable end thereof.

A pin 56 is suitably secured to the rear of the frame 11 and has a U-shaped clip 57 mounted for rotation thereon. A lock nut 58 keeps the rotatable clip 57 on the pin 56.

The tie element 54 is secured to the pin 56 by placing the slot 55 over said pin 56 within the U-shaped rotatable clip 57. The clip 57 is then rotated to reverse the position of the open end of the U-shaped clip 57 to prevent upward movement of the tie element 54.

Referring to Figure 2, the baby stroller-walker is collapsed by disengaging tie element 54 at its point of connection with the rear of top frame 11, and breaking the bar lock on each cross bar 31.

Modifications of this invention will be apparent to those skilled in the art without departing from the spirit thereof, and it is therefore desired to be limited only by the scope of the appended claims.

What I claim is:

1. A collapsible baby stroller-walker comprising, a top frame portion, a seat carried by said top frame, a bottom portion including front and rear wheel carrying members, wheels mounted on said wheel carrying members, a handle supported by said top and bottom portions, two side frame portions each composed of two bars crossed and pivoted together at their points of intersection, one of the said two cross bars in each side frame portion and its corresponding cross bar in the other side frame portion being pivotally secured to the top frame and fastened to the front wheel carrying member, the other of the said two cross bars in each side frame portion and its corresponding cross bar in the other side frame portion each having one end thereof pivotally secured to the said rear wheel carrying member and each having the other end thereof terminating short of its corresponding side of the top frame portion, a pair of tie bars each having one end thereof pivotally secured to the top frame portion with the other end thereof free for movement, each of the said shorter cross bars being pivotally secured to its corresponding tie bar intermediate the ends thereof, an L-shaped locking element for each of said tie bars having one leg secured to the inner face of each tie bar and extending therebeyond and the other leg of each locking element extending across a side edge of its tie bar and associated short cross bar, thereby permitting the adjacent portions of each tie bar and its short cross bar to lie in overlapped longitudinal alignment when the frame is in its extended position, a lever pivotally secured to each of said short cross bars and having a portion extending beyond each side of its short cross bar, a spring having one end connected to each short cross bar and its opposite end connected to one of the extended portions of its lever, the other extended portion of each lever constituting a handle for swinging the lever against the tension of its spring, the handle portion of each of said levers being provided with a cutaway portion for receiving the second mentioned leg of its L-shaped locking element.

2. A collapsible baby stroller-walker comprising, a top frame portion, a seat carried by said top frame, a bottom portion including front and rear wheel carrying members, wheels mounted on said wheel carrying members, a handle supported by said top and bottom portions, two side frame portions each composed of two bars crossed and pivoted together at their points of intersection, one of the said two cross bars in each side frame portion and its corresponding cross bar in the other side frame portion being pivotally secured to the top frame and fastened to the front wheel carrying member, the other of the said two cross bars in each side frame portion and its corresponding cross bar in the other side frame portion each having one end thereof pivotally secured to the said rear wheel carrying member and each having the other end thereof terminating short of its corresponding side of the top frame portion, a pair of tie bars each having one end thereof pivotally secured to the top frame portion with the other end thereof free for movement, each of the said shorter cross bars being pivotally secured to its corresponding tie bar intermediate the ends thereof, an L-shaped locking cross piece secured to each of said tie bars and extending across and beyond a side edge of each of said tie bars and its associated short cross bar, a spring tensioned lever pivotally secured to each of said short cross bars and each of said levers being provided with a cutaway portion for engagement with said L-shaped cross piece, a flange extending laterally from each of said levers adapted to serve as a handle for moving said lever into and out of engagement with said cross piece, and each of said levers being biased for the engagement of the cutaway portion thereof with its corresponding L-shaped locking cross piece.

3. A collapsible baby stroller-walker comprising, a top frame portion, a seat carried by said top frame, a bottom portion including front and rear wheel carrying members, wheels mounted on said wheel carrying members, a handle supported by said top and bottom portions, two side frame portions each composed of two bars crossed and pivoted together at their points of intersection, one of the said two cross bars in each side frame portion and its corresponding cross bar in the other side frame portion being pivotally secured to the top frame and fastened to the front wheel carrying member, the other of the said two cross bars in each side frame portion and its corresponding cross bar in the other side frame portion each having one end thereof pivotally secured to the said rear wheel carrying member and each having the other end thereof terminating short of its corresponding side of the top frame portion, a pair of tie bars each having one end thereof pivotally secured to the top frame portion with the other end thereof free for movement, each of the said shorter cross bars being pivotally secured to its corresponding tie bar intermediate the ends thereof, a locking element secured to each of said tie bars and extending across and beyond a side edge of each of said tie bars and its associated short cross bar, a spring tensioned lever pivotally secured to each of said short cross bars and each of said levers being provided with a cutaway portion for engagement with said locking element, and each of said levers being biased for the engagement of the cutaway portion thereof with its corresponding locking element.

ROBERT MOSTER.

REFERENCES CITED

The following references are of record in the file of this patent:

UNITED STATES PATENTS

| Number | Name | Date |
|---|---|---|
| 1,644,706 | Bernon | Oct. 11, 1927 |
| 1,764,914 | Vande Mark | June 17, 1930 |
| 2,179,275 | Sacheroff | Nov. 7, 1939 |
| 2,241,799 | Welsh | May 13, 1941 |
| 2,244,154 | Hendrickson | June 3, 1941 |
| 2,335,484 | Chrisman | Nov. 30, 1943 |
| 2,341,117 | Reinholz | Feb. 8, 1944 |